(12) United States Patent
Kazimirsky et al.

(10) Patent No.: US 12,452,177 B2
(45) Date of Patent: Oct. 21, 2025

(54) ADAPTIVE PORT ROUTING

(71) Applicant: MELLANOX TECHNOLOGIES, LTD., Yokneam (IL)

(72) Inventors: Amit Kazimirsky, Tel Aviv (IL); Eran Gil Beracha, Tel Aviv (IL); Liron Mula, Hertzliya (IL); Aviv Kfir, Nili (IL); Barak Gafni, Sunnyvale, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 93 days.

(21) Appl. No.: 18/226,587

(22) Filed: Jul. 26, 2023

(65) Prior Publication Data

US 2025/0039097 A1 Jan. 30, 2025

(51) Int. Cl.
*H04L 47/129* (2022.01)
*H04L 47/30* (2022.01)

(52) U.S. Cl.
CPC ............ *H04L 47/129* (2022.05); *H04L 47/30* (2013.01)

(58) Field of Classification Search
CPC ................ H04L 47/129; H04L 47/30
See application file for complete search history.

(56) References Cited

U.S. PATENT DOCUMENTS

| | | | |
|---|---|---|---|
| 8,478,891 B1* | 7/2013 | Breau | H04W 40/00 709/227 |
| 9,716,658 B1* | 7/2017 | Mandal | H04L 47/125 |
| 11,381,512 B1* | 7/2022 | Kadosh | H04L 41/0803 |
| 2011/0090789 A1* | 4/2011 | Fung | H04L 41/5025 370/230 |
| 2014/0105218 A1* | 4/2014 | Anand | H04L 47/6255 370/412 |
| 2015/0229555 A1* | 8/2015 | Edsall | G06F 13/385 370/235 |
| 2017/0331743 A1* | 11/2017 | Rimmer | H04L 45/28 |
| 2018/0006950 A1* | 1/2018 | Flajslik | H04L 47/30 |
| 2018/0302329 A1* | 10/2018 | Seely | H04L 49/3045 |
| 2021/0160172 A1* | 5/2021 | McDonald | H04L 45/24 |
| 2022/0329525 A1* | 10/2022 | Lu | H04L 47/41 |
| 2023/0062080 A1* | 3/2023 | Sidebottom | H04L 45/02 |

FOREIGN PATENT DOCUMENTS

| | | | | |
|---|---|---|---|---|
| EP | 3982612 A2 * | 4/2022 | | H04L 45/02 |
| WO | WO-2016026623 A1 * | 2/2016 | | G06F 15/17343 |

* cited by examiner

*Primary Examiner* — Glenton B Burgess
*Assistant Examiner* — Jihad K Boustany
(74) *Attorney, Agent, or Firm* — Sheridan Ross PC

(57) ABSTRACT

A device, communication system, and method are provided. In one example, a system for routing traffic is described that includes a plurality of ports to facilitate communication over a network. The system also includes a controller to selectively activate or deactivate ports of the system based on queue depths and additional information to improve power efficiency of the system.

20 Claims, 7 Drawing Sheets

ADAPTIVE PORT ROUTING

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Devices including but not limited to personal computers, servers, or other types of computing devices, may be interconnected using network devices such as switches. These interconnected entities form a network that enables data communication and resource sharing among the nodes. Often, multiple potential paths for data flow may exist between any pair of devices. This feature, often referred to as multipath routing, allows data, often encapsulated in packets, to traverse different routes from a source device to a destination device. Such a network design enhances the robustness and flexibility of data communication, as it provides alternatives in case of path failure, congestion, or other adverse conditions. Moreover, it facilitates load balancing across the network, optimizing the overall network performance and efficiency. However, managing multipath routing and ensuring optimal path selection can pose significant challenges, necessitating advanced mechanisms and algorithms for network control and data routing, and power consumption may be unnecessarily high, particularly during periods of low traffic.

BRIEF SUMMARY

In accordance with one or more embodiments described herein, a computing system, such as a switch, may enable a diverse range of systems, such as switches, servers, personal computers, and other computing devices, to communicate across a network. Ports of the computing system may function as communication endpoints, allowing the computing system to manage multiple simultaneous network connections with one or more nodes.

Each port of the computing system may be considered a lane and has an egress queue of packets/data waiting to be sent via the port. In effect, each port may serve as an independent channel for data communication to and from the computing system. Ports allow for concurrent network communications, enabling the computing system to engage in multiple data exchanges with different network nodes simultaneously.

As described herein, ports of a computing system may be selectively activated or deactivated based on a number of factors. Deactivating a port may comprise, as described in greater detail below, directing data to another port which lead to a same destination as the deactivated port by placing the data in a queue associated with the other port.

The present disclosure discusses a system and method for enabling a switch or other computing system to activate or deactivate one or more ports based on a number of factors. Embodiments of the present disclosure aim to solve the above-noted shortcomings and other issues by implementing an improved routing approach. The routing approach depicted and described herein may be applied to a switch, a router, or any other suitable type of networking device known or yet to be developed.

In an illustrative example, a device is disclosed that includes circuits to determine a buffer occupancy of a switch comprising a plurality of ports associated with a destination; determine a queue depth of a first one or more of the plurality of ports; based on the determined buffer occupancy and the queue depth of the first one or more of the plurality of ports, select a number of ports for traffic associated with the destination; and activate or deactivate a second one or more of the plurality of ports associated with the destination based on the selected number of ports.

In another example, a system is disclosed that includes one or more circuits to determine a buffer occupancy of a switch comprising a plurality of ports associated with a destination; determine a queue depth of a first one or more of the plurality of ports; based on the determined buffer occupancy and the queue depth of the first one or more of the plurality of ports, select a number of ports for traffic associated with the destination; and activate or deactivate a second one or more of the plurality of ports associated with the destination based on the selected number of ports.

In yet another example, a switch is disclosed that includes one or more circuits to receive data associated with a destination; determine a buffer occupancy of the switch, wherein the switch comprises a plurality of ports associated with the destination; determine a queue depth of a first one or more of the plurality of ports; based on the determined buffer occupancy and the queue depth of the first one or more of the plurality of ports, select a number of ports for traffic associated with the destination; activate or deactivate a second one or more of the plurality of ports associated with the destination based on the selected number of ports; and after activating or deactivating the second one or more of the plurality of ports associated with the destination, route the data to the destination.

Any of the above example aspects include wherein the number of required ports is further determined based on historical traffic data between the switch and the destination.

Any of the above example aspects include wherein activating or deactivating the second one or more of the plurality of ports comprises updating a routing table based on the selected number of ports.

Any of the above example aspects include wherein updating the routing table comprises selecting, based on a priority of each of the plurality of ports associated with the destination, the one or more of the ports to activate or deactivate.

Any of the above example aspects include wherein the priority of each port is determined based on a number of destinations with which each of the plurality of ports associated with the destination is associated.

Any of the above example aspects include wherein the priority of each port is determined based on a number of fixed flows with which each of the plurality of ports associated with the destination is associated.

Any of the above example aspects include wherein the one or more circuits are further to determine a number of active ports among the plurality of ports associated with the destination.

Any of the above example aspects include wherein selecting the number of ports for traffic associated with the destination is further based on the number of active ports among the plurality of ports associated with the destination and a total number of the plurality of ports associated with the destination.

Any of the above example aspects include wherein the one or more circuits are further to, after activating or deactivating the second one or more of the plurality of ports, determine an updated queue depth for each active port associated with the destination.

Any of the above example aspects include wherein the one or more circuits are further to update a routing table based on the updated queue depth.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
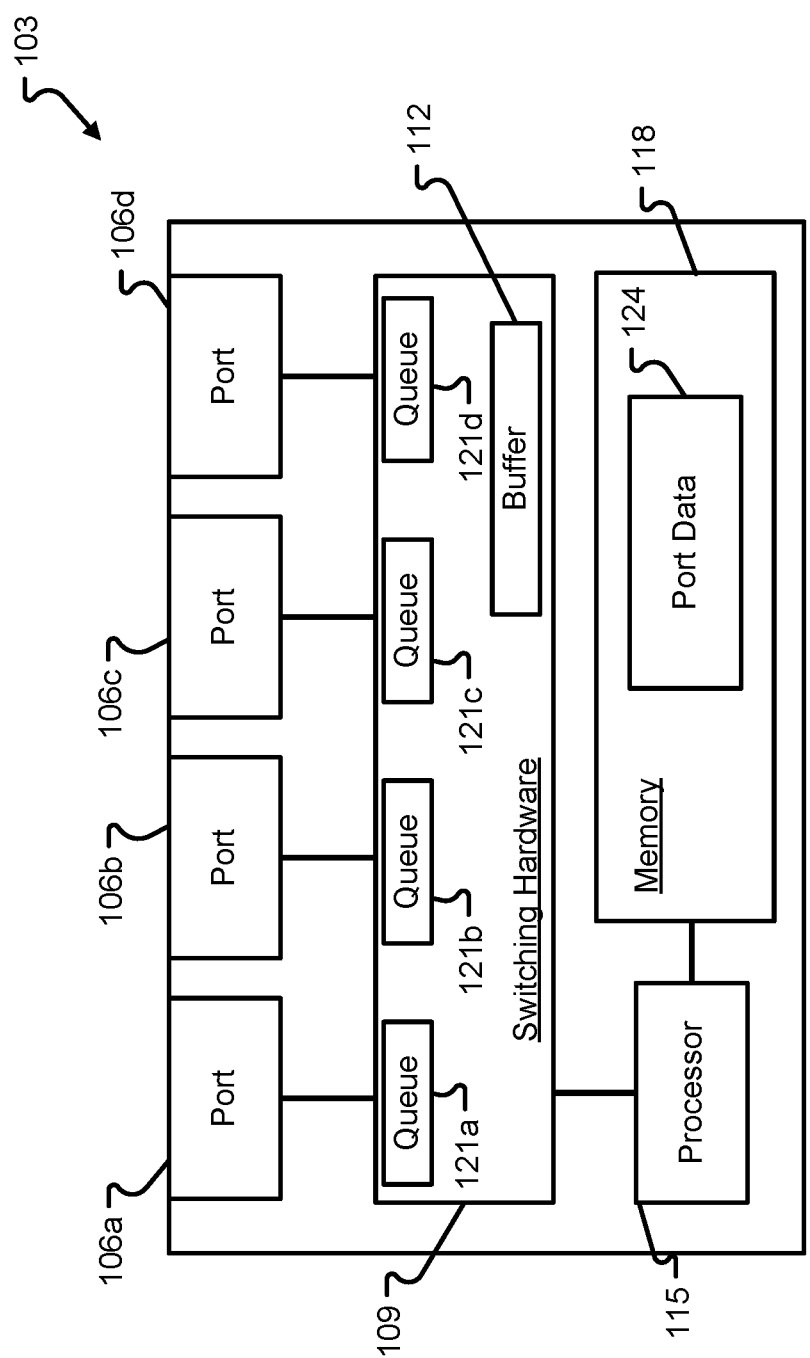
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems, and methods for routing packets between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

In accordance with one or more embodiments described herein, a computing system 103 as illustrated in FIG. 1 may enable a diverse range of systems, such as switches, servers, personal computers, and other computing devices, to communicate across a network. Such a computing system 103 as described herein may for example be a switch or any computing device comprising a plurality of ports 106*a-d* for connecting with nodes on a network.

The ports 106*a-d* of the computing system 103 may function as communication endpoints, allowing the computing system 103 to manage multiple simultaneous network connections with one or more nodes. Each port 106*a-d* may be used to transmit data associated with one or more flows. Each port 106*a-d* may be associated with a queue 121*a-d* enabling the port 106*a-d* to handle incoming and outgoing data packets associated with flows.

Each port 106 of the computing system may be considered a lane and has an egress queue of packets/data waiting to be sent via the port. In effect, each port 106 may serve as an independent channel for data communication to and from the computing system 103. Ports 106 allow for concurrent network communications, enabling the computing system 103 to engage in multiple data exchanges with different network nodes simultaneously.

Each port 106*a-d* may be associated with an egress queue 121*a-d* which may store data, such as packets, waiting to be transmitted from the respective port 106*a-d*. As a packet or other form of data becomes ready to be sent from the computing system 103, the packet may be assigned to a port 106 from which the packet will be sent, and the packet may be stored in a queue 121 associated with the port.

The ports 106*a-d* of the computing system 103 may be physical connection points which allow network cables such as Ethernet cables to connect the computing system 103 to one or more network nodes. Each port 106*a-d* may be of a different type, including, for example, a 100 Mbps, 1000 Mbps, or 10-Gigabit Ethernet ports, each providing different levels of bandwidth.

As described herein, the ports 106*a-d* may be selectively activated or deactivated based on a number of factors. Deactivating a port 106*a-d* may comprise, as described in greater detail below, directing data to another port 106*a-d* which lead to a same destination as the deactivated port 106*a-d* by placing the data in a queue 121*a-d* associated with the other port 106*a-d*. Activating a port 106*a-d* may comprise, as described in greater detail below, directing data to the port 106*a-d* by placing the data in a queue 121*a-d* associated with the port 106*a-d*.

Switching hardware 109 of the computing system may comprise an internal fabric or pathway within the computing system 103 through which data travels between two ports 106*a-d*. The switching hardware 109 may in some embodiments comprise one or more network interface cards (NICs). For example, in some embodiments, each port 106*a-d* may be associated with a different NIC. The NIC or NICs may comprise hardware and/or circuitry which may be used to transfer data between ports 106*a-d*.

Switching hardware 109 may also or alternatively comprise one or more application-specific integrated circuits (ASICs) to perform tasks such as determining to which port a received packet should be sent. The switching hardware 109 may comprise various components including, for example, port controllers that manage the operation of individual ports, network interface cards that facilitate data transmission, and internal data paths that direct the flow of data within the computing system 103. The switching hardware 109 may also include memory elements to temporarily store data and management software to control the operation of the hardware. This configuration could enable the switching hardware 109 to accurately track port usage and provide data to the processor 115 upon request.

Packets received by the computing system 103 may be placed in a buffer 112 until being placed in a queue 121*a-d* before being transmitted by a respective port 106*a-d*. The buffer 112 may effectively be an ingress queue where received data packets may temporarily be stored. As described herein, the ports 106*a-d* via which a given packet is to be sent may be determined based on a number of factors.

As illustrated in FIG. 1, the computing system 103 may also comprise a processor 115, such as a CPU, a microprocessor, or any circuit or device capable of reading instructions from memory 118 and performing actions. The processor 115 may execute software instructions to control operations of the computing system 103.

The processor 115 may function as the central processing unit of the computing system 103 and is fundamental to executing the system's operative capabilities. Processor 115 communicates with other components of the computing system 103 to manage and perform computational operations, ensuring optimal system functionality and performance.

In further detail, the processor 115 may be engineered to perform a wide range of computational tasks. Its capabilities may encompass executing program instructions, managing data within the system, and controlling the operation of other hardware components such as switching hardware 109. The processor 115 may be a single-core or multi-core processor and might include one or more processing units, depending on the specific design and requirements of the computing system 103. The architectural design of the processor 115 may allow for efficient instruction execution, data processing, and overall system management, thereby enhancing the computing system 103's performance and utility in various applications. Furthermore, the processor 115 may be programmed or adapted to execute specific tasks and operations according to application requirements, thus potentially enhancing the versatility and adaptability of the computing system 103.

The computing system 103 may further comprise one or more memory 118 components. Memory 118 may be configured to communicate with the processor 115 of the computing system 103. Communication between memory 118 and the processor 115 may enable various operations, including but not limited to, data exchange, command execution, and memory management. In accordance with implementations described herein, memory 118 may be used to store data, such as port data 124, relating to the usage of the ports 106*a-d* of the computing system 103.

The memory 118 may be constituted by a variety of physical components, depending on specific type and design. At the core, memory 118 may include one or more memory cells capable of storing data in the form of binary information. These memory cells may be made up of transistors, capacitors, or other suitable electronic components depending on the memory type, such as DRAM, SRAM, or Flash memory. To enable data transfer and communication with other parts of the computing system 103, memory 118 may also include data lines or buses, address lines, and control lines. Such physical components may collectively constitute the memory 118, contributing to its capacity to store and manage data, such as port data 124.

Port data 124, as which may be stored in memory 118, could encompass information about various aspects of port usage. Such information might include data about active connections, amount of data in queues 121, amount of data in the buffer 112, statuses of each port within the ports 106*a-d*, among other things. Port data 124 may include, for example, buffer-occupancy, a number of active ports 106*a-d*, a number of total ports 106*a-d*, and a queue depth or length for each port 106*a-d*, as described in greater detail below. The stored port data 124 could be accessed and utilized by the processor 115 in managing port operations and network communications. For example, the processor 115 might utilize the port data 124 to manage network traffic, prioritize, or otherwise control the flow of data through the computing system 103 as described in greater detail below. Therefore, the memory 118, in potential conjunction with the processor 115, may play a crucial role in optimizing the usage and performance of the ports 106 of the computing system 103.

In one or more embodiments of the present disclosure, a processor 115 of a computing system 103 such as a switch may execute polling operations to retrieve data relating to activity of the ports 106*a-d*, such as by polling the switching hardware 109. As used herein, polling may involve the processor 115 periodically querying or requesting data from the switching hardware 109. The polling process may encompass the processor 115 sending a request to the switching hardware 109 to retrieve desired data. Upon receiving the request, the switching hardware 109 may compile the requested port usage data and send it back to the processor 115.

Port data 124 may include various metrics such as amount of data or a number of packets in each queue 121*a-d*, an amount of data or a number of packets in the buffer 112, and/or other information, such as data transmission rates, error rates, and status of each port. The processor 115, after receiving this data, might perform further operations based on the obtained information, such as optimizing port usage, balancing network load, or troubleshooting issues, as described herein.

Port data 124 as described herein may include an indication as to with which group or groups each port 106*a-d* is associated. As described in greater detail below, ports 106*a-d* may be grouped based on which destinations are reachable via the ports 106*a-d*. For example, ports 106*a-d* which can be used to communicate with a first particular node may be in a first group while ports 106*a-d* which can be used to communicate with a second particular node may be in a second group. It should be appreciated, as described below, one port 106*a-d* may be in one or more groups.

Figure 2:
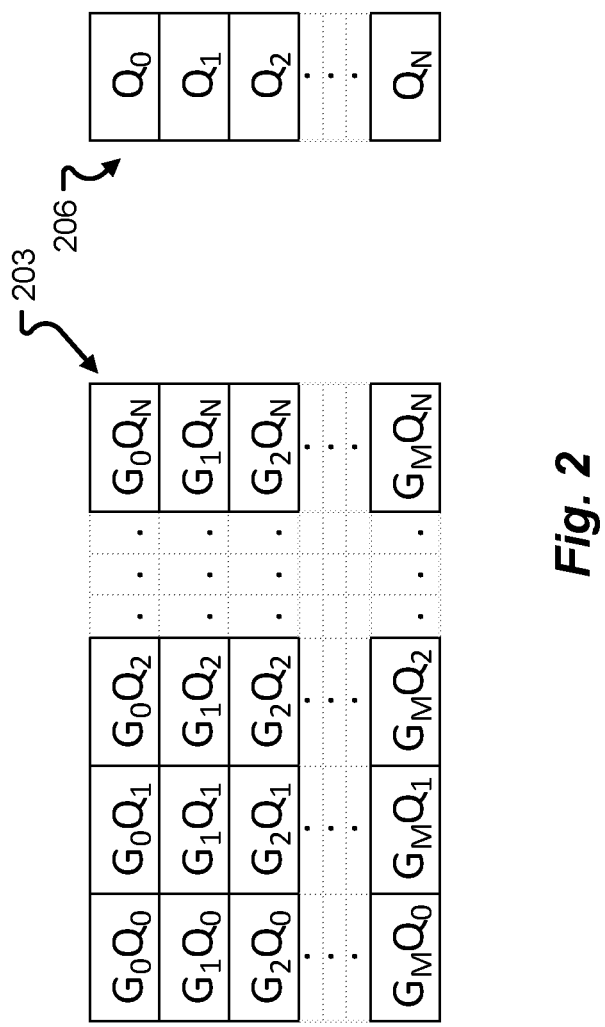
FIG. 2 is a block diagram depicting an illustrative configuration of a matrix and a vector in accordance with at least some embodiments of the present disclosure.

As illustrated in FIG. 2, a matrix 203 may be used to track with which group each queue 121 is associated. For example, each group may be a row in the matrix 203 and each queue 121 may be a column. A one in the entry for each group and queue 121 may indicate the queue 121 is associated with the particular group. A zero in the entry for each group and queue 121 may indicate the queue 121 is not associated with the particular group. For example, the G0Q0 cell of the matrix 203 represents a queue zero and a group zero, and the GMQN cell of the matrix 203 represents a queue N and a group M.

Port data 124 as described herein may include a current queue depth for each port 106. The current queue depth for a port 106 may be an amount of data, a number of packets, a percentage of used queue space, or other variable which may be used by the processor 115 to determine a usage of each port 106.

The queue depth for each port may be stored in a vector 206 as illustrated in FIG. 2. For example, a first entry in the vector 206 may indicate a queue depth for a queue zero and a last entry in the vector 206 may indicate a queue depth for a queue N, where queue zero is associated with a port zero and queue N is associated with a port N.

Based on the indication as to with which group or groups each port 106*a-d* is associated and the current queue depth for each port 106*a-d*, the processor 115 may be capable of determining a total queue depth by summing all queue depths of all ports 106*a-d* associated with a particular group. Determining the total queue depth for each group may be accomplished by multiplying the matrix 203 of port-to-group associations with the vector 206 of current queue depths for each port 106*a-d*.

In one or more embodiments of the present disclosure, the processor 115 of the computing system 103 may poll data from the buffer 112 to determine an occupancy of the buffer 112. Buffer occupancy as used herein may represent an amount of data or a number of packets currently stored in the buffer 112 and/or an amount of free space available for data storage in the buffer 112.

The processor 115 may obtain the buffer occupancy information by, for example, periodically sending requests to the buffer 112 to retrieve information about the current occupancy of the buffer or by periodically reading a register or memory location in which an indication of the amount of data in the buffer is stored. Buffer occupancy information may include a number of data packets currently stored in the buffer 112 and/or an amount of free space remaining in the buffer 112.

In some embodiments, the buffer 112, from which the processor 115 polls data, may comprise a memory unit or area designated for temporary storage of data packets waiting to be processed or transmitted. The buffer 112 may also contain or be in communication with control logic or management software which tracks the occupancy status of the buffer 112.

In some embodiments, the processor 115 may perform calculations relating to the buffer occupancy. For example, buffer occupancy data may be input into a formula by the processor 115 to generate a parameter indicating a risk of dropping packets due to the buffer 112 reaching capacity. As should be appreciated, the fewer the number of ports 106 are active, the greater the risk of packets being dropped due to the buffer reaching capacity, as the reduced number of egress ports create a bottleneck. Generally speaking, when the buffer occupancy is higher or near full, more available ports are needed to reduce the risk of dropping packets.

In one or more embodiments of the present disclosure, the processor 115 of the computing system 103 may execute operations to determine the number of active and inactive ports within the computing system 103. Active as used herein may indicate that the port is currently engaged in data transmission or reception, while inactive may indicate that the port is not presently involved in data transfer activities.

In some embodiments, the processor 115 may issue requests or commands to components of the computing system 103 such as the switching hardware 109 to fetch an operational status of each port 106*a-d* or queue 121*a-d*. Upon receiving these requests, the components may provide the required data to the processor 115. Such data may include the current activity status of each port 106*a-d*, such as whether the port 106*a-d* is active or inactive.

In certain embodiments, the processor 115 may also perform computations to calculate a percentage representation of the active ports. Such a calculation may involve dividing the number of active ports by the total number of ports. The obtained percentage may serve as a quantitative measure of the system activity.

System activity as used herein may refer to the percentage of active ports at any given time. System activity may provide an overview of the system's utilization for performance monitoring, system optimization, and capacity planning, such as in accordance with the systems and methods described herein. Generally speaking, when a small percentage of ports are active, the system 103 may be prone to dropping packets or data which bursts occur compared to a scenario where a high percentage of ports are active.

In one or more embodiments of the present disclosure, the processor 115 may use the collected data pertaining to port activity to monitor and maintain a historical queue depth for each queue 121a-d associated with the ports 106a-d. Such information may be stored in memory 118, such as part of the port data 124 to form a historical record of the queue depths. In some implementations, the processor 115 may update the historical queue depth for each queue on a periodic basis. The update frequency may vary depending on the specific requirements and design considerations of the system 103. Each update may involve polling the latest port usage data, recalculating the queue depths, and storing the new data in the memory. The updated data may replace the old data or be appended to it.

In one or more embodiments of the present disclosure, the processor 115, after obtaining the relevant data pertaining to port usage, port activity, historical queue depth for each queue 121a-d, and/or other information, may store the information in memory 118 as port data 124. Port data 124 may comprise, for example, parameters and metrics related to port usage, buffer occupancy, system activity level, and queue depths, among others.

Figure 3:
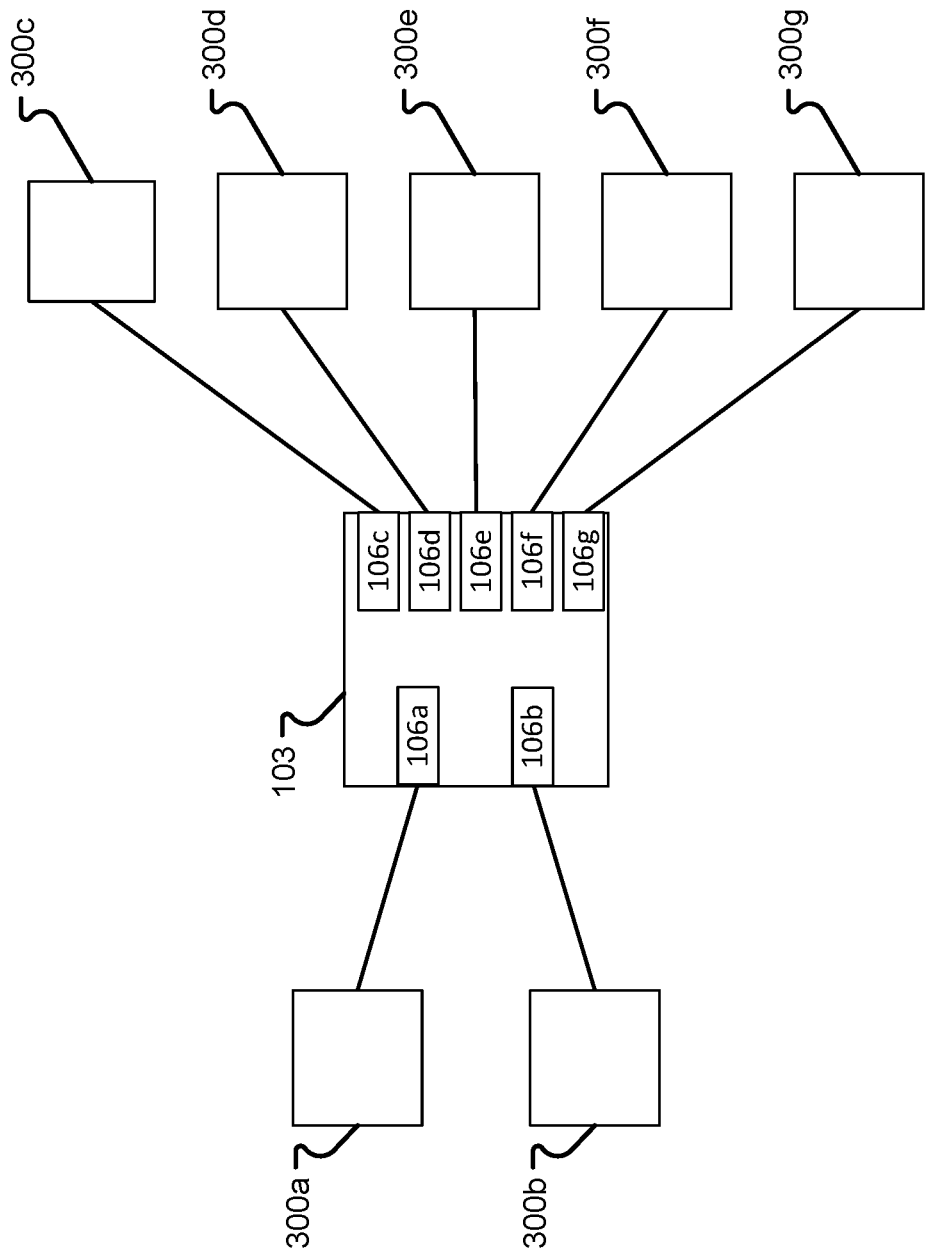
FIG. 3 illustrates a network of a computing system and nodes in accordance with at least some embodiments of the present disclosure.

In one or more embodiments of the present disclosure, a computing system 103, such as a switch, may be in communication with a plurality of network nodes 300a-g as illustrated in FIG. 3. Each network node 300a-g may be a computing system with capabilities for sending and receiving data. Each node 300a-g may be any one of a broad range of devices, including but not limited to switches, personal computers, servers, or any other device capable of transmitting and receiving data in the form of packets.

The computing system 103 may establish communication channels with the network nodes 300 via its ports. Such channels may support data transfer in the form of flows of packets, following predetermined protocols that govern the format, size, transmission method, and other aspects of the packets.

Each network node 300a-g may interact with the computing system 103 in various ways. A node 300 may send data packets to the computing system 103 for processing, transmission, or other operations, or for forwarding to another node 300. Conversely, each node 300 may receive data from the computing system 103, originating from either the computing system 103 itself or other network nodes 300a-g via the computing system 103. In this way, the computing system 103 and nodes 300a-g could collectively form a network, facilitating data exchange, resource sharing, and a host of other collaborative operations.

Figure 4:
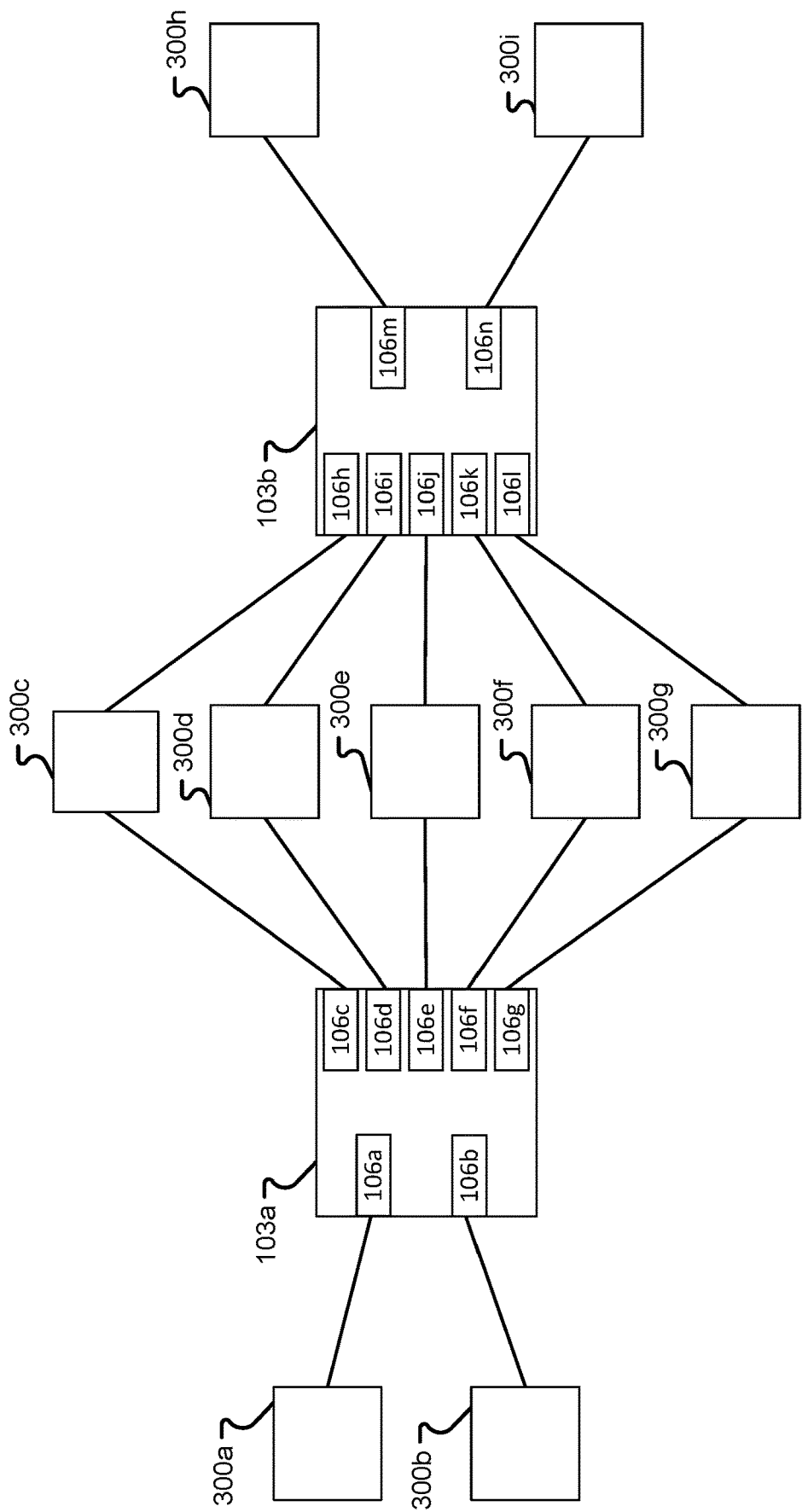
FIG. 4 illustrates a network of computing systems and nodes in accordance with at least some embodiments of the present disclosure.

As illustrated in FIG. 4, nodes 300a-i may be connected to a plurality of computing systems 103a-b as described herein forming a network of nodes 300a-i and computing systems 103a-b. For example, the systems and methods described herein may comprise a plurality of interconnected switches. Multiple computing systems 103a-b, such as switches, can be interconnected in a variety of topologies, such as star, ring, or mesh, depending upon the specific requirements and resilience needed for the network. For instance, in a star topology, a plurality of switches may be connected to a central switch, whereas in a ring topology, each switch may be connected to two other switches in a closed loop. In a mesh topology, each switch may be interconnected with every other switch in the network. These robust structures afford a level of redundancy, as there are multiple paths for data to travel, ensuring that network functionality can be maintained even in the event of a switch failure. For example, as illustrated in FIG. 4, for a packet to be sent from node 300a to node 300h, the packet may travel from the computing system 103a to the computing system 103b via any one of nodes 300c-g as computing system 103a is integrated with computing system 103b via multiple ports.

While computing systems 103a and 103b are illustrated as being connected via nodes 300c-g, it should be appreciated the separating nodes 300c-g may be omitted and the computing systems 103a-b may be directly interconnected via any number of one or more ports.

Integrating multiple ports of a first computing system 103a with a second computing system 103b, as opposed to using a single port connection, offers a range of benefits, most prominently increased bandwidth and redundancy. The aggregation of multiple connections between the two switches effectively increases the available data pipeline size, allowing for greater throughput. This is particularly useful in high-demand environments where data traffic is substantial. Furthermore, establishing multiple connections enhances network resilience. If one connection fails, the network can continue operating as usual, utilizing the remaining active connections.

In the example illustrated in FIG. 4, node 300a is connected to port 106a of computing system 103a, node 300b is connected to port 106b of computing system 103a, node 300c is connected to port 106c of computing system 103a and to port 106h of computing system 103b, node 300d is connected to port 106d of computing system 103a and to port 106i of computing system 103b, node 300e is connected to port 106e of computing system 103a and to port 106j of computing system 103b, node 300f is connected to port 106f of computing system 103a and to port 106k of computing system 103b, node 300g is connected to port 106g of computing system 103a and to port 106l of computing system 103b, node 300h is connected to port 106m of computing system 103b, and node 300i is connected to port 106n of computing system 103b. As a result, any of nodes 300a-i can communicate with other of nodes 300a-i via one or both of the computing systems 103a-b. For example, computing system 103a may use any of ports 106c-g to send a packet from node 300a to node 300h or 300i.

Figure 5:
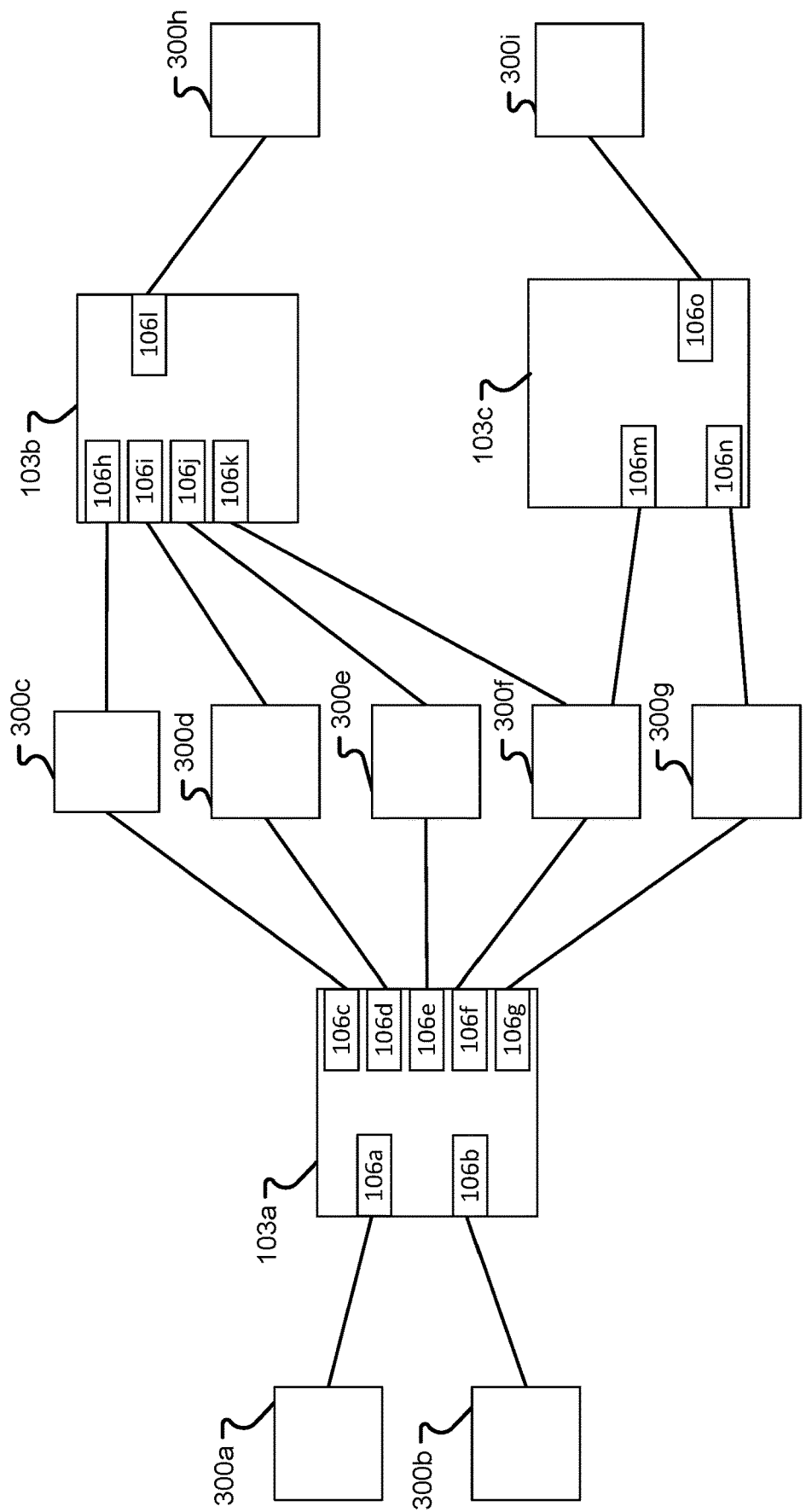
FIG. 5 illustrates a network of computing systems and nodes in accordance with at least some embodiments of the present disclosure.

As illustrated in FIG. 5, communication between certain nodes 300a-i may be accessed only via certain ports 106a-o of certain computing systems 103a-c. In the example illustrated in FIG. 5, node 300a is connected to port 106a of computing system 103a, node 300b is connected to port 106b of computing system 103a, node 300c is connected to port 106c of computing system 103a and to port 106h of computing system 103b, node 300d is connected to port 106d of computing system 103a and to port 106i of computing system 103b, node 300e is connected to port 106e of computing system 103a and to port 106j of computing system 103b, node 300f is connected to port 106f of computing system 103a, to port 106k of computing system 103b, and to port 106m of computing system 103c, node 300g is connected to port 106g of computing system 103a and to port 106n of computing system 103c, node 300h is connected to port 106l of computing system 103b, and node 300i is connected to port 106o of computing system 103c. As a result, while any of nodes 300a-i can communicate with other of nodes 300a-i via computing system 103a, communication from one of nodes 300a-b to node 300h must be made via one of ports 106c-f of the computing system 103a and communication from one of nodes 300a-b to node 300i must be made via one of ports 106f-g of the computing system 103a.

Because not every port 106a-g of a computing system 103a may be used to communicate with every possible node 300, each port 106a-g can be considered as being a part of one or more groups of ports based on the nodes which can be served via the port 106a-g. In the example illustrated in FIG. 4, each of ports 106c-g can be used to communicate with nodes 300h and 300i. As such, in FIG. 4, each of ports 106c-g may be in a common group. On the other hand, as illustrated in FIG. 5, ports 106c-f of a computing system 103a may be in a first group associated with a node 300h and ports 106f-g of the computing system 103a may be in a second group associated with node 300i. As should be appreciated, in the example illustrated in FIG. 5, port 106f is in both of the first and second groups. The group with which each port is associated may depend on the physical connections between computing systems 103 and nodes 300.

Because there may be multiple paths for data to follow to get to a particular destination, one or more ports 106 of a computing system 103 can be activated or deactivated without degrading the flow of data.

Figure 6:
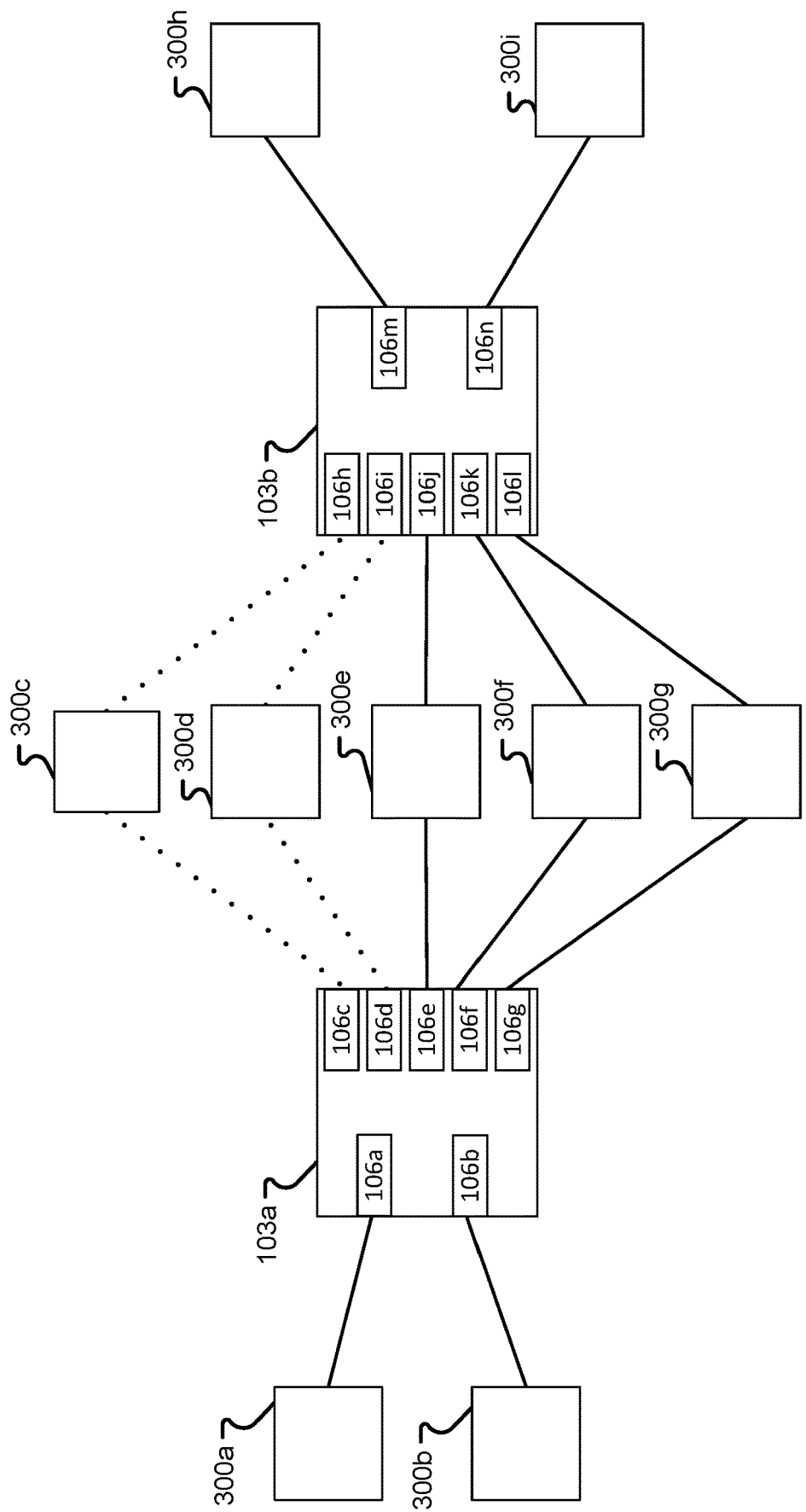
FIG. 6 illustrates a network of computing systems and nodes in accordance with at least some embodiments of the present disclosure.

As illustrated in FIG. 4, a flow between node 300a and node 300h can travel through any of ports 106c-g of computing system 103a. If ports 106c and 106d are deactivated, the flow can continue via ports 106e-g. If the data rate does not exceed the capacity of ports 106e-g, the flow can continue essentially unaffected by the deactivated ports 106c and 106d. As illustrated in FIG. 6, the dotted lines connecting port 106c and node 300c, port 106d and node 300d, node 300c and port 106h, and node 300d and port 106i represented deactivated lanes. As should be appreciated, despite these deactivated lanes, other lanes exist to enable communication via any of nodes 300a, 300b, and 300e-i.

Because multiple ports 106 of a computing system 103 may lead to the same destination, one or more ports may be unnecessary except in high-traffic situations. Under normal operating situations, ports may either be under used or not used. Using conventional routing methods, traffic is spread evenly across all hardware ports, resulting in a maximum amount of hardware involved in routing decisions, without taking into account the hardware utilization.

On the other hand, using a system as described herein, power efficiency of a computing system, such as in a data center network, can be improved by taking into consideration network utilization, without impacting performance. The systems and methods described herein involve routing traffic using a minimal amount of hardware, resulting in a reduction of power consumption. Using a system or method as described herein, ports that are not needed can be disabled or deactivated and can be reenabled when additional ports are needed. Ports 106 of a computing system 103 may be removed from the ports capable of being selected for transmitting data such as by masking ports out from a group associated with the destination of the data, resulting in port shut down. In some embodiments, the shutting down of a port may occur due to an autonomous port mechanism which may shut down ports. In addition, when traffic is very low, entire switches/devices may enter sleep mode in order to minimize power usage. For example, as illustrated in FIG. 6, nodes 300c and 300d, which may be switches, can be deactivated as computing systems 103a and 103b cease to send packets to the nodes 300c, 300d.

Figure 7:
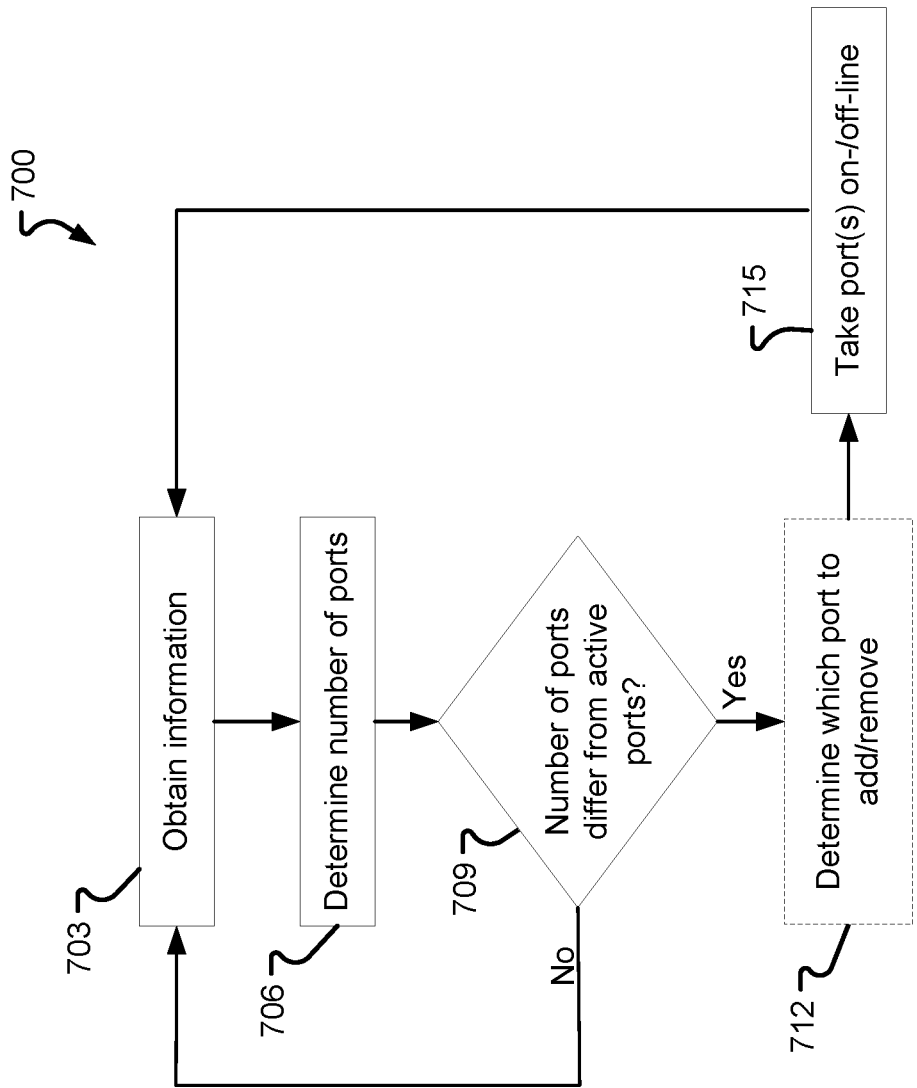
FIG. 7 is a flow diagram depicting a method in accordance with at least some embodiments of the present disclosure.

As illustrated in FIG. 7, and in accordance with a computing system 103 as illustrated in FIG. 1 and as described herein, a method 700 may be performed to enable ports to be activated or deactivated as needed to reduce power consumption by a computing system 103. While the description of the method 700 provided herein describes the steps of the method 700 as being performed by a processor 115 of the computing system 103, the steps of the method 700 may be performed by one or more processors 115, switching hardware 109, one or more controllers in the computing system 103, or some combination thereof. As a result of the method 700, based on current and historical port usage, the computing system 103 may use an ideal number of ports to enable traffic flows while maximizing power efficiency and minimizing packet loss. The method 700 of FIG. 7, as described below, may be performed separately for each group among the one or more groups of ports. For example, the method 700 may be performed in parallel for each group or may be performed in series for each group.

At 703, the processor 115 of the computing system 103 may obtain information as needed to determine an ideal number of active ports. As described above, the processor 115 of a computing system may be configured to poll port data 124 from switching hardware 109. Such information might include data about active connections, amount of data in queues 121, amount of data in the buffer 112, statuses of each port within the ports 106a-d, among other things. Port data 124 may include various metrics such as amount of data or a number of packets in each queue 121a-d, an amount of data or a number of packets in the buffer 112, and/or other information, such as data transmission rates, error rates, and status of each port. The processor 115, after receiving this data, might perform further operations based on the obtained information, such as optimizing port usage, balancing network load, or troubleshooting issues, as described herein.

The processor 115 may execute polling operations to retrieve data relating to activity of the ports 106a-d by polling the switching hardware 109. The polling process may encompass the processor 115 sending a request to the switching hardware 109 to retrieve desired data. Upon receiving the request, the switching hardware 109 may compile the requested port usage data and send it back to the processor 115.

Port data 124 as described herein may include a current queue depth for each port 106. The current queue depth for a port 106 may be an amount of data, a number of packets, a percentage of used queue space, or other variable which may be used by the processor 115 to determine a usage of each port 106.

Based on the indication as to with which group or groups each port 106a-d is associated and the current queue depth for each port 106a-d, the processor 115 may be capable of determining a total queue depth by summing all queue depths of all ports 106a-d associated with a particular group. Determining the total queue depth for each group may be accomplished by multiplying the matrix 203 of port-to-group associations with the vector 206 of current queue depths for each port 106a-d.

In one or more embodiments of the present disclosure, the processor 115 of the computing system 103 may poll data from the buffer 112 to determine an occupancy of the buffer 112. The processor 115 may obtain the buffer occupancy information by, for example, periodically sending requests to the buffer 112 to retrieve information about the current occupancy of the buffer or by periodically reading a register or memory location in which an indication of the amount of data in the buffer is stored. Buffer occupancy information may include a number of data packets currently stored in the buffer 112 and/or an amount of free space remaining in the buffer 112.

In some embodiments, the processor 115 may perform calculations relating to the buffer occupancy. For example, buffer occupancy data may be input into a formula by the processor 115 to generate a parameter indicating a risk of dropping packets due to the buffer 112 reaching capacity. As should be appreciated, the fewer the number of ports 106 are active, the greater the risk of packets being dropped due to the buffer reaching capacity, as the reduced number of egress ports create a bottleneck. Generally speaking, when the buffer occupancy is higher or near full, more available ports are needed to reduce the risk of dropping packets.

In one or more embodiments of the present disclosure, the processor 115 of the computing system 103 may execute operations to determine the number of active and inactive ports within the computing system 103. In certain embodiments, the processor 115 may also perform computations to calculate a percentage representation of the active ports. Such a calculation may involve dividing the number of active ports by the total number of ports.

The processor 115 may use the collected data pertaining to port activity to monitor and maintain a historical queue depth for each queue 121a-d associated with the ports 106a-d. Such information may be stored in memory 118, such as part of the port data 124 to form a historical record of the queue depths.

In one or more embodiments of the present disclosure, the processor 115, after obtaining the relevant data pertaining to port usage, port activity, historical queue depth for each queue 121a-d, and/or other information, may store the information in memory 118 as port data 124.

At 706, after obtaining the buffer occupancy, number of active ports, total number of ports, and ports queue length, the processor 115 may use that information calculate a number of ports to use for transmitting future packets. The calculated number of ports to use for transmitting future packets may be described as an ideal or optimal number of ports, as the number of ports may be calculated in such a way as to minimize the power consumption while ensuring the rate of dropped packets does not exceed an unreasonable number such as a threshold or based on user settings.

Determining the number of ports to use for transmitting future packets may involve performing one or more initial adjustments to the data obtained at 703. For example, the group port queue depth for each group may be divided by a number of ports for the respective group to obtain an average queue depth per port of the group.

The historical queue depth may be a moving weighted average of past queue depths for all queues of the system 103. The processor may in some embodiments be capable of determining past queue depth samples and applying a weighted average. In this way, the processor may learn from the historical port usage.

The historical queue depth, which may be referred to as historical traffic data, may be a parameter which gives weight to previous queue depth values in order to minimize the noise caused from sudden bursts. As a result, system may be capable of identifying if the queue depth of the queues of the system are continuously rising or whether there is only a momentary burst.

The processor may also calculate a function of the buffer occupancy and the system activity. The function of the buffer occupancy and the system activity may have a direct correlation to the buffer occupancy, meaning that when the buffer occupancy increases, the function of the buffer occupancy and the system activity increases. And the function of the buffer occupancy and the system activity may have an inverse correlation to the system activity, meaning that when the system activity decreases, the function of the buffer occupancy and the system activity increases.

Based on the determined queue depth for each queue in each group, the moving weighted average of past queue depths for all queues of the system, and the function of the determined buffer occupancy and the system activity, processor may select a number of ports for the system to use for transmitting future packets.

At 709, the processor may check whether the selected number of ports for the system to use for transmitting future packets differs from the number of currently active ports.

If the number of ports for the system to use for transmitting future packets is different than the current number of active ports, the processor may either enable or disable ports as described below. But, if the number of ports for the system to use for transmitting future packets is the same as the number of currently active ports, the method 700 may comprise returning to 703 and obtaining information to repeat the process of determining the number of ports for the system to use for transmitting future packets.

At 712, if the number of ports for the system to use for transmitting future packets differs from the current number of active ports, the processor may determine which port or ports to activate or deactivate.

While in some embodiments, each port of a group may be treated equally, and when the number of ports needs to be reduced or increased, any port may be activated or deactivated, in some embodiments, the processor may select the port or ports to be activated or deactivated, such as based on a priority of each port.

In some embodiments and scenarios, the processor may not be capable of deactivating one or more ports. For example, some traffic may not be moveable from one port of a switch to another port of the switch. Such traffic may include, for example, a TCP flow connecting two hosts, UDP flows, or other types of fixed flows. On the other hand, RDMA can include mixed flows which can be spread across multiple ports.

Ports which handle flows in which packets can be delivered out of order and which do not handle flows which cannot be moved to another port may be assigned a higher priority than ports which handle flows which cannot be moved to another port. For example, ports which handle flows which cannot be moved to another port may be assigned a highest priority level, meaning the processor would select such ports only as a last resort or never in some embodiments.

Among the ports which the processor is capable of activating or deactivating, each may be ranked according to priorities. As used herein, a low priority port may be a port which is most likely to be selected by the processor to deactivate. When the processor needs to activate a port, the processor may select the deactivated port with the highest priority. When the processor needs to deactivate a port, the processor may select the activated port with the lowest priority.

To select ports with equivalent priorities, the processor may choose to send traffic to a leftmost available port in some embodiments. Such configuration settings may be user-configurable.

Each port may be associated with a static priority score which may not change over time. The priority of ports which do not handle flows which cannot be reassigned may be determined when the system initializes. When the system initializes, the system may determine how many groups each port belongs to and sets increasing priority to ports which belong to more groups. Meaning that a port that belongs to fewer groups will shut down before a port that belongs to more groups. In this way, the priority of a port may be determined based on a number of destinations and/or a number of fixed flows with which each port is associated.

The processor may be capable of determining a priority of each active or deactivated port and based on the priority select the port or ports to activate or deactivate to reach the number determined at 706. For example, if ports are to be deactivated, the processor may select the appropriate number of active ports with the lowest priority. If ports are to be activated, the processor may select the appropriate number of deactivated ports with the highest priority.

At 715, after determining which port or ports to activate or deactivate, the processor may activate or deactivate the port or ports determined at 712 as needed. In one or more embodiments of the present disclosure, the processor may manage the status of ports by creating or modifying a port mask. The port mask may be a binary representation where each bit corresponds to a specific port. An active port might be represented by a one, while an inactive port might be represented by a zero. To deactivate a port, the processor may change a corresponding bit in the port mask from one to zero. This alteration may signal to a port controller or other control software within the system that the port should cease data transmission and/or reception, thereby rendering the port inactive. Similarly, to activate a previously deactivated port, the processor may create or edit a port mask by changing or setting a corresponding bit to one. This change may indicate to control mechanisms of the switching hardware that the port should resume its data transfer operations. The processor may also or alternatively update a routing table based on the appropriate number of ports. In some embodiments, a routing table may comprise a port mask or otherwise contain sufficient information to be used by switching hardware to direct packets. In this way, the processor, through the modification of a port mask or routing table, may dynamically manage the active and inactive statuses of the switch's ports.

After creating or editing the port mask, or otherwise activating or deactivating ports as needed, the method 700 may comprise returning to 703 and repeat. For example, after activating or deactivating the one or more ports, the processor may return to 703 and determine an updated queue depth for each active port, before determining an updated number of ports which should be active and updating a routing table based on the updated queue depth.

In one or more embodiments of the present disclosure, the method 700, after executing, may return to 703 and recommence the process. In some implementations, the repetition of method 700 may occur without delay. In such cases, as soon as the method 700 concludes, the method 700 may immediately begin the next iteration. This arrangement could allow for a continuous execution of method 700. In some implementations, a pause for a predetermined amount of time may occur between successive iterations of method 700. The duration of the pause may be specified as per the operational needs of the method such as by a user.

The present disclosure encompasses methods with fewer than all of the steps identified in FIG. 7 (and the corresponding description of the method), as well as methods that include additional steps beyond those identified in FIG. 7 (and the corresponding description of the method). The present disclosure also encompasses methods that comprise one or more steps from the methods described herein, and one or more steps from any other method described herein.

Embodiments of the present disclosure include a device comprising one or more circuits to determine a buffer occupancy of a switch comprising a plurality of ports associated with a destination; determine a queue depth of a first one or more of the plurality of ports; based on the determined buffer occupancy and the queue depth of the first one or more of the plurality of ports, select a number of ports for traffic associated with the destination; and activate or deactivate a second one or more of the plurality of ports associated with the destination based on the selected number of ports.

Aspects of the above device include wherein the selected number of ports is further determined based on historical traffic data between the switch and the destination.

Aspects of the above device include wherein activating or deactivating the second one or more of the plurality of ports comprises updating a routing table based on the selected number of ports.

Aspects of the above device include wherein updating the routing table comprises selecting, based on a priority of each of the plurality of ports associated with the destination, the one or more of the ports to activate or deactivate.

Aspects of the above device include wherein the priority of each port is determined based on a number of destinations with which each of the plurality of ports associated with the destination is associated.

Aspects of the above device include wherein the priority of each port is determined based on a number of fixed flows with which each of the plurality of ports associated with the destination is associated.

Aspects of the above device include wherein the one or more circuits are further to determine a number of active ports among the plurality of ports associated with the destination.

Aspects of the above device include wherein selecting the number of ports for traffic associated with the destination is further based on a number of active ports among the plurality of ports associated with the destination and a total number of the plurality of ports associated with the destination.

Aspects of the above device include wherein the one or more circuits are further to, after activating or deactivating the second one or more of the plurality of ports, determine an updated queue depth for each active port associated with the destination.

Aspects of the above device include wherein the one or more circuits are further to update a routing table based on the updated queue depth.

Embodiments of the present disclosure also include a system comprising one or more circuits to: determine a buffer occupancy of a switch comprising a plurality of ports associated with a destination; determine a queue depth of a first one or more of the plurality of ports; based on the determined buffer occupancy and the queue depth of the first one or more of the plurality of ports, select a number of ports for traffic associated with the destination; and activate or deactivate a second one or more of the plurality of ports associated with the destination based on the selected number of ports.

Aspects of the above system include wherein the selected number of ports is further determined based on historical traffic data between the switch and the destination.

Aspects of the above system include wherein activating or deactivating the second one or more of the plurality of ports comprises updating a routing table based on the selected number of ports.

Aspects of the above system include wherein updating the routing table comprises selecting, based on a priority of each of the plurality of ports associated with the destination, the one or more of the ports to activate or deactivate.

Aspects of the above system include wherein the priority of each port is determined based on a number of destinations with which each of the plurality of ports associated with the destination is associated.

Aspects of the above system include wherein the priority of each port is determined based on a number of fixed flows with which each of the plurality of ports associated with the destination is associated.

Aspects of the above system include wherein the one or more circuits are further to determine a number of active ports among the plurality of ports associated with the destination.

Aspects of the above system include wherein selecting the number of ports for traffic associated with the destination is further based on a number of active ports among the plurality of ports associated with the destination and a total number of the plurality of ports associated with the destination.

Aspects of the above system include wherein the one or more circuits are further to, after activating or deactivating the second one or more of the plurality of ports, determine an updated queue depth for each active port associated with the destination.

Embodiments of the present disclosure also include a switch comprising one or more circuits to: receive data associated with a destination; determine a buffer occupancy of the switch, wherein the switch comprises a plurality of ports associated with the destination; determine a queue depth of a first one or more of the plurality of ports; based on the determined buffer occupancy and the queue depth of the first one or more of the plurality of ports, select a number of ports for traffic associated with the destination; activate or deactivate a second one or more of the plurality of ports associated with the destination based on the selected number of ports; and after activating or deactivating the second one or more of the plurality of ports associated with the destination, route the data to the destination.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A device comprising one or more circuits to:
   determine a buffer occupancy of a switch comprising a plurality of ports associated with a destination;
   determine a queue depth of a first one or more of the plurality of ports;
   based on the determined buffer occupancy and the queue depth of the first one or more of the plurality of ports, select a number of ports to allocate for traffic associated with the destination; and
   allocate the selected number of ports for the traffic associated with the destination by activating or deactivating a second one or more of the plurality of ports associated with the destination.

2. The device of claim 1, wherein the selected number of ports is selected further determined-based on historical traffic data between the switch and the destination.

3. The device of claim 1, wherein activating or deactivating the second one or more of the plurality of ports comprises updating a routing table based on the selected number of ports.

4. The device of claim 3, wherein updating the routing table comprises selecting, based on a priority of each of the plurality of ports associated with the destination, the one or more of the ports to activate or deactivate.

5. The device of claim 4, wherein the priority of each port is determined based on a number of destinations with which each of the plurality of ports associated with the destination is associated.

6. The device of claim 4, wherein the priority of each port is determined based on a number of fixed flows with which each of the plurality of ports associated with the destination is associated.

7. The device of claim 1, wherein the one or more circuits are further to determine a number of active ports among the plurality of ports associated with the destination and compare the selected number of ports to the number of active ports.

8. The device of claim 1, wherein selecting the number of ports to allocate for traffic associated with the destination is further based on a number of active ports among the plurality of ports associated with the destination and a total number of the plurality of ports associated with the destination.

9. The device of claim 1, wherein the one or more circuits are further to, after activating or deactivating the second one or more of the plurality of ports, determine an updated queue depth for each active port associated with the destination.

10. The device of claim 9, wherein the one or more circuits are further to update a routing table based on the updated queue depth.

11. A system comprising one or more circuits to:
    determine a buffer occupancy of a switch comprising a plurality of ports associated with a destination;
    determine a queue depth of a first one or more of the plurality of ports;
    based on the determined buffer occupancy and the queue depth of the first one or more of the plurality of ports, select a number of ports to allocate for traffic associated with the destination; and
    allocate the selected number of ports for the traffic associated with the destination by activating or deactivating a second one or more of the plurality of ports associated with the destination.

12. The system of claim 11, wherein the number of ports is selected further based on historical traffic data between the switch and the destination.

13. The system of claim 11, wherein activating or deactivating the second one or more of the plurality of ports comprises updating a routing table based on the selected number of ports.

14. The system of claim 13, wherein updating the routing table comprises selecting, based on a priority of each of the plurality of ports associated with the destination, the one or more of the ports to activate or deactivate.

15. The system of claim 14, wherein the priority of each port is determined based on a number of destinations with which each of the plurality of ports associated with the destination is associated.

16. The system of claim 14, wherein the priority of each port is determined based on a number of fixed flows with which each of the plurality of ports associated with the destination is associated.

17. The system of claim 11, wherein the one or more circuits are further to determine a number of active ports among the plurality of ports associated with the destination and compare the selected number of ports to the number of active ports.

18. The system of claim 11, wherein selecting the number of ports to allocate for traffic associated with the destination is further based on a number of active ports among the plurality of ports associated with the destination and a total number of the plurality of ports associated with the destination.

19. The system of claim 11, wherein the one or more circuits are further to, after activating or deactivating the second one or more of the plurality of ports, determine an updated queue depth for each active port associated with the destination.

20. A switch comprising one or more circuits to:

receive data associated with a destination;

determine a buffer occupancy of the switch, wherein the switch comprises a plurality of ports associated with the destination;

determine a queue depth of a first one or more of the plurality of ports;

based on the determined buffer occupancy and the queue depth of the first one or more of the plurality of ports, select a number of ports to allocate for traffic associated with the destination;

allocate the selected number of ports for the traffic associated with the destination by activating or deactivating a second one or more of the plurality of ports associated with the destination based on the selected number of ports; and after activating or deactivating the second one or more of the plurality of ports associated with the destination, route the data to the destination via the selected number of ports.

* * * * *